PHOTOCONDUCTIVE TARGET WITH N-TYPE LAYER OF CADMIUM SELENIDE INCLUDING CADMIUM CHLORIDE AND CUPROUS CHLORIDE

Original Filed July 15, 1968

Yuji Kiuchi
Kazuo Shimizu
Osio Yoshida
INVENTOR.

BY George Cifrolk
Attorney

United States Patent Office

Re. 28,156
Reissued Sept. 10, 1974

28,156

PHOTOCONDUCTIVE TARGET WITH N-TYPE LAYER OF CADMIUM SELENIDE INCLUDING CADMIUM CHLORIDE AND CUPROUS CHLORIDE

Yuji Kiuchi and Kazuo Shimizu, Yokohama, and Okio Yoshida, Kawasaki, Japan, assignors to Tokyo Shibaura Electric Co., Ltd., Kawasaki-shi, Japan Original No. 3,571,646, dated Mar. 23, 1971, Ser. No. 744,743, July 15, 1968. Application for reissue Mar. 21, 1973, Ser. No. 343,489
Claims priority, application Japan, July 17, 1967, 42/45,640
Int. Cl. H01j *31/28, 39/06, 39/18*
U.S. Cl. 313—94 3 Claims

Matter enclosed in heavy brackets [ ] appears in the original patent but forms no part of this reissue specification; matter printed in italics indicates the additions made by reissue.

ABSTRACT OF THE DISCLOSURE

This photoconductive target comprises a photoconductive member consisting of two layers: a first layer 0.5 micron minimum thick formed on a transparent electrode and a second layer 0.6 micron maximum thick superposed on the first layer so as to be disposed on the side electron gun. The first layer is solely or mainly made of cadmium selenide, and the second layer is formed from a high resistance semiconductor material.

Figure 1:
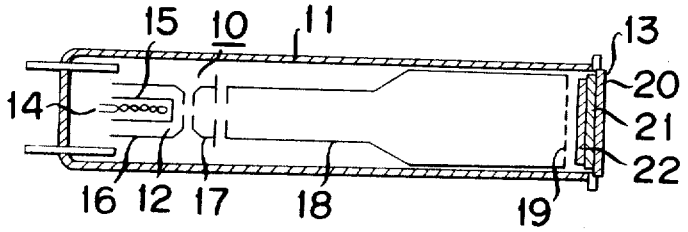

The present invention relates to a photoconductive target, more particularly to the high sensitivity and high resistance photoconductive target of a photoelectric amplifier or photoconductive image pickup tube (having the same construction as the one commercially known as Vidicon, Plumbicon, etc.) used in the television and other fields.

The conventional photoconductive target of a photoconductive image pickup tube is prepared by depositing a photoconductive layer on a transparent faceplate disposed at one end of a vacuum vessel and constituting a light input plane, with a transparent signal electrode inserted therebetween. While an image pickup tube provided with, for example, such a photoconductive target is in operation, the signal electrode is impressed with a positive voltage (for example, 30 volts), and the surface of the photoconductive layer is scanned by low velocity electron beams emitted from an electron gun similarly enclosed in the vacuum vessel in an opposite relation to said target. The electric resistance of the photoconductive layer varies with the intensity of light entering the image pickup tube from the outside through the faceplate, so that when scanned by the electron beam, a signal current is produced through a load resistance connected to the transparent electrode in proportion to the intensity of the incident light.

It has already been often experienced that the properties of the photoconductive image pickup tube are effected by those of a photoconductive member forming a photoconductive target. Generally, the photoconductive layer consists of a porous P-type material such as antimony trisulfide, lead monoxide, etc. However, these materials have been unable to display a fully satisfactory effect as a photoconductive layer. Therefore to ensure the stability and improved effect of a photoconductive target, it has been attempted, in the case of antimony trisulfide, for example, to prepare the target from three layers of the sulfide, namely, a so-called continuous solid layer—a so-called porous layer—a continuous solid layer arranged in the order mentioned in the direction of the thickness of the photoconductive layer thus formed. The term "porous layer," as used herein, means a loose aggregate of relatively large particles of the photoconductive material vapor deposited in low vacuum, for example $10^{13}$ torr, and the term "continuous solid layer" means a compact or vitreous layer of minutely fine particles of said material vapor deposited in high vacuum, for example $10^{15}$ torr. It may be generalized that where the same material is used, a porous layer thereof has a relatively high apparent resistance to the introduced electrons, whereas a continuous solid layer thereof has a relatively low apparent resistance thereto. In fact, therefore, the quality of an image regenerated by an image pickup tube using such material is determined by a combination of resistivity measured in the direction of the thickness of the photoconductive layer and resistivity measured in a direction perpendicular thereto, namely, a direction parallel with the surface of said layer.

In addition to the aforementioned antimony trisulfide photoconductive layer, there has been proposed a lead monoxide photoconductive target as a more sensitive type. Plumbicon using this target has recently come to the practically used in color television cameras. As compared with the image pickup tube of Image Orthicon type, however, these photoconductive ones still have a lower photosensitivity. Consequently strong demand has been voiced for development of a far more sensitive photoconductive target.

In response to this request, the inventors previously developed a photoconductive target using cadmium selenide as a photoconductive layer, and disclosed that an image pickup tube comprising this target had as high a photosensitivity as more than ten times that of an image pickup tube consisting of the conventional photoconductive target. This photoconductive target was distinct from the one in common use not only in respect of the use of a different material as a photoconductive layer, but also in the fact that cadmium selenide used as said layer possessed an N-type electronic conductivity. The operational difference between such N-type photoconductive target and the previously known P-type target lies in the fact that in case of N-type conductivity, scanning electron beams can be freely introduced into a photoconductive layer to reach the signal electrode. The high photosensitivity of the N-type target originates with the fact that photoexcited holes in the layer are immediaely caught in the recombination centers within the layer and that a secondary photocurrent can continue to flow due to the influx of electron beams until the captured hole is recombined with a free electron. However, like a target prepared from the conventional photoconductive material, the target comprising a cadmium selenide photoconductive layer still had the drawbacks that it was impossible to obtain a signal current, unless an appreciably high target voltage was applied and that there was a limit to the latitude in which the target could be operated.

The photoconductive target of the present invention composed of cadmium selenide formed on a transparent electrode to a thickness of 0.5 micron minimum and a second layer made of a high resistance semiconductor material superposed on the first layer to a thickness of 0.6 micron maximum so as to broaden the potential gradient in that part of the second layer which faces the first layer, and ease the electron influx from the second layer. Accordingly, the present photoconductive target produces a signal current at a low target voltage and is operable over a broad range of voltage.

Figure 2:
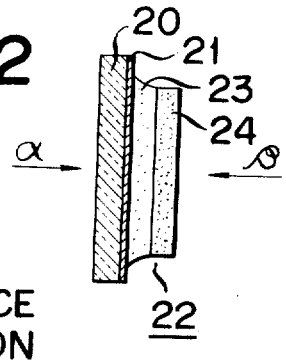
Figure 3:
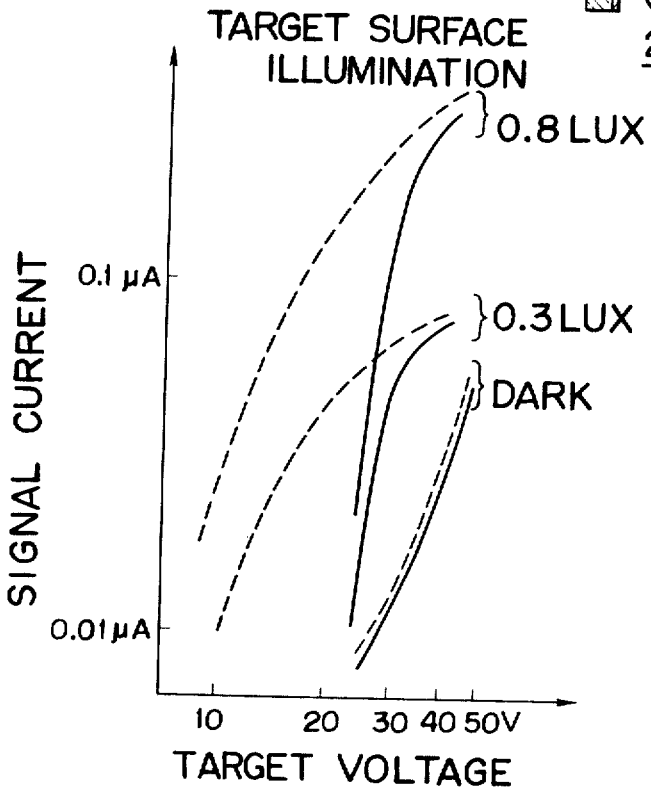

The present invention can be more understood from the following detailed description when taken in connection with the accompaying drawing in which:

FIG. 1 is a schematic sectional view of an image pickup tube fitted with the photoconductive target according to the present invention;

FIG. 2 is a schematic sectional view of an embodiment of the photoconductive target according to the invention; and FIG. 3 is a curve diagram offered by way of comparing the prior photoconductive target only provided with a photoconductive layer mainly consisting of cadmium selenide and the photoconductive target according to the present invention provided with a photoconductive layer prepared in the manner shown in FIG. 2, regarding the capacity of generating a signal current at a given target voltage, with the target illumination as a parameter, the currents and voltages of the present invention being the dashed lines.

There will now be described an embodiment of the present invention by reference to the appended drawing. As shown in FIG. 1, the structure of the image pickup tube using the target of the present invention has the same construction as other common Vidicon-type tubes except for the target, so there is only given a brief description of the ordinary Vidicon-type construction. The tube 10 as illustrated comprises a vacuum vessel 11 containing an electron gun section 12 and a photoconductive target assembly 13. The electron gun assembly 12 comprises a heater 14, a cathode 15 surrounding the heater, and a control grid electrode 16 and an accelerating electrode 17 both disposed coaxially with the cathode 15. An electrode 18 is mounted coaxially with said accelerating electrode 17, and a mesh electrode 19 is disposed so as to face said cathode at one end of the electrode 18 opposite to the accelerating electrode 17. The photoconductive target section 13 comprises a transparent glass substrate 20, a transparent conductive layer 21 deposited on said substrate 20, and a photoconductive target 22 according to the invention, said target 22 being deposited on the conductive layer 21 to face the mesh electrode 19.

As shown in FIG. 2, the photoconductive target of the present invention consists of a first layer 23 mainly composed of cadmium selenide formed on a transparent electrode 21 and a second layer 24 made of high resistance semiconductive material such as antimony trisulfide superposed on the first layer 23. In the FIG., the arrow $\alpha$ denotes the direction from which light is projected and the arrow $\beta$ shows the direction in which electron beams are introduced.

There will now be described an example of the method of manufacturing a photoconductive target in accordance with the present invention. On a transparent electrode 21 on a transparent substrate is vapor deposited in as high vacuum as 1 or $2\times10^{15}$ mm. Hg a layer of cadmium selenide about 1 micron thick. Prior to vapor deposition, there are added in advance to cadmium selenide, for example, 20 percent by weight of cadmium chloride and 0.05 percent by weight of cuprous chloride. The layer thus laminated by vapor deposition is further sintered, for example, by heating 15 minutes at a temperature of 600° C. in a nitrogen atmosphere. The mass is then subjected to heat treatment in a selenium atmosphere, for example, 30 minutes at a temperature of 500° C., to obtain a high resistivity photoconductive layer. This layer is named a first layer 23 for convenience. On the first layer 23 is vapor deposited in the aforesaid high vacuum of $10^{15}$ mm. Hg a layer of antimony trisulfide 24 having a thickness of 0.4 micron to form the photoconductive target of the present invention. Addition of cuprous chloride in this process is intended to elevate the photoconductivity of the layer obtained. And inclusion of cadmium chloride in heat treatment after vapor deposition aims at the acceleration of growth of cadmium selenide crystals. In this case, cadmium selenide alone, of course, fully serves the purpose. Further, the cadmium selenide component may consist of a solid solution or mixture containing a proper amount of cadmium sulfide (for example, weight ratio of cadmium sulfide to cadmium selenide = 1:2). Further, the added impurities may include in addition to copper one or more of silver, gold, thallium, indium, gallium, aluminum, halogens, tellurium, antimony, bismuth, lead, tin, alkalki metals, and alkali earth metals.

An image pickup tube containing a target consisting of the first and second layers prepared by the aforementioned process has, as shown in FIG. 3, far more excellent properties than the prior target which lacked the second layer of antimony trisulfide. FIG. 3 compares the present and prior targets with the signal current value (logarithmic scale) represented by the ordinate and the target voltage value (logarithmic scale) denoted by the abscissa, using the target illuminations (0.8 lux, 0.3 lux and nonillumination) as a parameter. The solid curves of FIG. 3 indicate the properties of the prior target and the dashed curves denote those of the present target.

As seen from the FIG., the present target uses a far lower voltage than the prior one in obtaining the same signal current. This is particularly prominent where there is only required a minute signal current. Moreover, the application of such a low target voltage does not affect the dark current value. The photoconductive target according to the invention permits the target voltage to be chosen over a broader range than in the prior art device. For example, based on 0.8 lux illumination, the prior art ranges in target voltage between about 40 volts and about 25 volts, whereas the present invention ranges from about 45 volts to about 8 volts.

While the present invention has such good effect as may be understandable from FIG. 3, it has a further advantage of reducing the afterimage. Let us take a case, for example, where a photoconductive image pickup tube is operated and a test pattern is illuminated one minute thereon and after removal of said pattern it is exposed to a white light. Then the initial test pattern remains with the prior target only using a first layer of cadmium selenide. However, a photoconductive image pickup tube containing the target of the present invention does not substantially present any afterimage when it undergoes the same operation. Namely, this image pickup tube not only possesses the high sensitivity and panchromatism of the prior image pickup tube simply provided with cadmium selenide as a first layer, but also is more improved in various undesirable transitory properties associated with an image produced, thus offering a greater practical use.

The vital point of a composite target according to the present invention is that its first layer consists of cadmium selenide which itself possesses a sufficient photosensitivity. If the first layer has a poor photosensitivity, a composite target, though prepared pursuant to the invention, would offer no advantage. It will be apparent that the method of manufacturing this first layer is not limited to the aforementioned embodiment. For instance, prior to heat treatment in a selenium atmosphere, it is possible to carry out the vapor deposition of the required layer in an inert atmosphere in as low vacuum as $10^{11}$ mm. Hg instead of $10^{15}$ mm. Hg as previously described.

From the standpoint of allowing the first layer to have a full photosensitivity, it is preferred that the first layer be 0.5 micron minimum thick. The reason is that if the first layer is too thin, it will result in the reduction of photosensitivity and increase of a dark current and failure to produce high quality television pictures.

There will now be described the second layer involved in a composite target with antimony trisulfide taken as an example. In the foregoing embodiment, antimony trisulfide forms a continuous solid layer 0.4 micron thick. If the thickness increases over 0.6 micron, there will only be obtained an instantaneous regenerated picture at the time of pickup. Thus the regenerated image will disappear at once, rendering the image pickup tube quite useless. From the aforementioned operating principle of the first layer, this is considered due to the fact that such a thick second layer will obstruct the inflow of electron beams to stop the flow of a secondary photocurrent. In other words, the second layer formed on the first layer should not be so thick as appreciably to prevent the inflow of scanning electron beams. The materials of the second layer may include in addition to the aforesaid antimony trisulfide other high resistance semiconductor materials such as antimony triselenide, arsenic trisulfide, arsenic triselenide, bismuth trisulfide, bismuth triselenide, cadmium telluride, lead monoxide, selenium, zinc sulfide and zinc selenide. When the second layer consisted of any of the above-listed materials the same results were obtained as in the preceding embodiment. Since these materials have different specific resistances, the upper limit to the thickness of a layer prepared therefrom varies according to whether it is formed into a continuous solid layer or porous one. For instance, where arsenic trisulfide having a relatively high specific resistivity is used as a second layer, it is preferably formed into a continuous solid layer in consideration of the ease of controlling the layer thickness in vapor deposition. And in the case of a material having a relatively low specific resistivity such as antimony triselenide it is desirable to form it into a porous layer also in the sense of preventing the degradation of the resolving capability of the layer thus prepared. While the second layer may of course consist of one or more layers, the total thickness thereof should not exceed 0.6 micron in any case.

The spectroscopic photosensitivity of the first layer mainly consisting of cadmium selenide prevails all over the visible ray region from the blue to the red. In other words, the layer has a great absorption coefficient over the entire region of visible light beams. Accordingly the light which has been transmitted through the first layer is considerably reduced in the power of exciting the second layer. The second layer used in the present invention is only prepared by vapor deposition, requiring no further special treatment.

Since the above-listed second layer materials include P-type materials, it may be imagined that there will be formed a back-biased PN junction between the first layer (N-type layer) and the second layer (P-type layer). As seen from FIG. 3, however, the characteristics of the composite target according to the present invention are such that while the whole range of the operating voltage of the target rather shifts toward the low voltage side, the target displays substantially analogous current-voltage properties to those of a target only provided with a first layer. Therefore the composite target does not display a current saturated condition due to the presence of a PN junction as generally supposed. This fact proves that the photoelectric converting properties of the target according to the present invention are quite independent of the problem of special contact between the first and second layers. The second layer is only intended to ease the inflow of electron beams by locally providing a sharp potential gradient on the scanned surface of the first layer. In other words, the second layer acts to reduce a large number of levels present on the surface of the first layer, which behave traps to charge carriers. This effects comes from the fact that the transitory properties of the target, for example, the undesirable afterimage originates with the trapping of a charge carrier by these surface levels.

While the invention has been described in connection with some preferred embodiments thereof, the invention is not limited thereto and includes any modifications and alterations which fall within the scope of the invention as defined in the appended claims.

We claim:

1. A photoconductive target comprising a first N-type layer made of cadmium selenide containing cadmium chloride and cuprous chloride formed on a substrate of transparent electrically conductive material to a thickness of about 0.5 micron minimum and a second P-type layer made of at least one high resistance semiconductor material selected from the group consisting of zinc sulfide and zinc selenide to a thickness of about 0.6 micron maximum.

*2. A photoconductive target section adapted to be scanned by an electron beam, comprising*

*(a) a transparent substrate,*

*(b) a transparent conductive layer mounted directly upon said substrate, and*

*(c) a target comprising:*

*(i) a first layer mounted directly on said transparent conductive layer, said first layer being made of cadmium selenide and having a minimum thickness of 0.5 micron so as to absorb substantially all of the light incident upon said target, and*

*(ii) means for providing a sharp potential gradient on the scanned surface of said first layer, said means including a second layer of a high resistivity semiconductor material mounted directly on said first layer on the side of said first layer remote from the light-receiving side of said target, said second layer being sufficiently thick to provide said potential gradiant and having a maximum thickness of 0.6 micron, and said high resistivity semiconductor material being selected from the group consisting of antimony trisulfide, antimony triselenide, arsenic trisulfide, arsenic triselenide, bismuth trisulfide, bismuth triselenide, cadmium telluride, lead monoxide, selenium, zinc sulfide and zinc selenide.*

*3. A photoconductive target section according to Claim 2, wherein said second layer is arsenic trisulfide.*

References Cited

The following references, cited by the Examiner, are of record in the patented file of this patent or the original patent.

UNITED STATES PATENTS

| | | | |
|---|---|---|---|
| 3,020,442 | 2/1962 | Nicholson et al. | 313—65 A X |
| 3,238,062 | 3/1966 | Sunners et al. | 117—201 |
| 3,346,755 | 10/1967 | Dresner | 313—94 |
| 3,486,059 | 12/1969 | Kiuchi et al. | 313—65 A |
| 3,403,278 | 9/1968 | Kahng et al | 313—94 X |
| 2,997,630 | 8/1961 | Kruse | 313—102 |
| 3,315,108 | 4/1967 | Heagy | 313—65 A |

FOREIGN PATENTS

| | | | |
|---|---|---|---|
| 1,086,603 | 10/1967 | Great Britain | 313—94 |

ROBERT SEGAL, Primary Examiner

U.S. Cl. X.R.

313—65A